United States Patent

Cronin et al.

[11] Patent Number: 6,000,512
[45] Date of Patent: Dec. 14, 1999

[54] OVERRUNNING CLUTCH WITH SPRING ENERGIZED CAGE CENTERING DEVICE

[75] Inventors: Christopher J. Cronin, Royal Oak; Michael Z. Creech, Grosse Pointe Woods, both of Mich.; Dieter Seidel, Heidelberg, Germany

[73] Assignee: Dana Corporation, Toledo, Ohio

[21] Appl. No.: 08/902,777

[22] Filed: Jul. 30, 1997

[51] Int. Cl.⁶ .................................................. F16D 41/06
[52] U.S. Cl. ......................... 192/38; 192/45; 192/54.52; 464/35; 464/82
[58] Field of Search ............................... 192/45, 38, 31, 192/44, 41, 54.2, 54.52; 188/82.84; 464/30, 35, 37, 34, 160, 906, 100, 81, 82

[56] References Cited

U.S. PATENT DOCUMENTS

| | | | |
|---|---|---|---|
| 643,647 | 2/1900 | Harmon . | |
| 1,880,457 | 10/1932 | Morley et al. | 192/44 |
| 2,408,335 | 9/1946 | Oliver et al. | 81/53 |
| 2,497,361 | 9/1950 | Kesterton | 192/44 |
| 2,989,160 | 6/1961 | Woodruff | 192/12 |
| 3,262,526 | 7/1966 | Kramer | 192/38 |
| 3,300,002 | 1/1967 | Roper | 192/44 X |
| 3,752,277 | 8/1973 | Nakai | 192/56 R |
| 3,964,318 | 6/1976 | Shutt | 74/471 R |
| 4,244,456 | 1/1981 | Loker | 192/27 |
| 4,901,831 | 2/1990 | Ito et al. . | |
| 5,040,652 | 8/1991 | Fish et al. | 464/35 X |
| 5,135,084 | 8/1992 | Ito et al. | 192/38 |
| 5,443,147 | 8/1995 | Gratzer | 192/44 X |

FOREIGN PATENT DOCUMENTS

| | | | |
|---|---|---|---|
| 205031 | 11/1984 | Japan | 192/45 |
| 1271573 | 4/1972 | United Kingdom . | |

OTHER PUBLICATIONS

Printout from www.hilliardcorp.com/mcdmtoc.html dated Jul. 5, 1997.

*Primary Examiner*—Charles A Marmor
*Assistant Examiner*—Ankur Parekh
*Attorney, Agent, or Firm*—Rader, Fishman & Grauer PLLC

[57] ABSTRACT

The present invention is directed to a spring energized cage centering device for a bi-directional overrunning clutch. The clutch includes an inner race, an outer race, and a cage disposed between them. A biasing member is disposed between a cavity formed in the outer periphery of the inner race and a pocket formed in the inner periphery of the cage which permits rotational movement between the inner race and the cage, but rotationally biases the cage with respect to the inner race toward a neutral position. In one preferred embodiment, the cavity extends through the centerpoint of the inner race to form two openings in the inner race, the biasing member extending through the cavity and radially outwardly from the openings to engage the cage at two different circumferential locations.

8 Claims, 4 Drawing Sheets

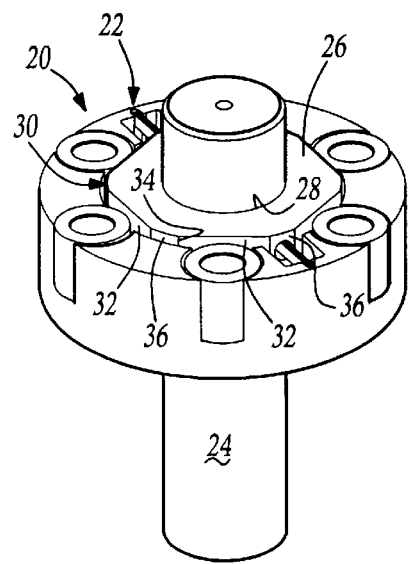
Fig-1
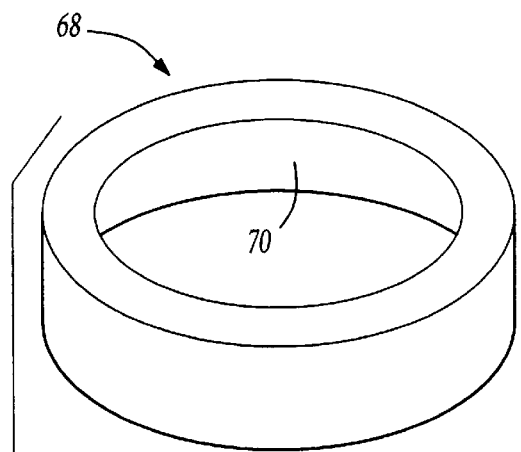
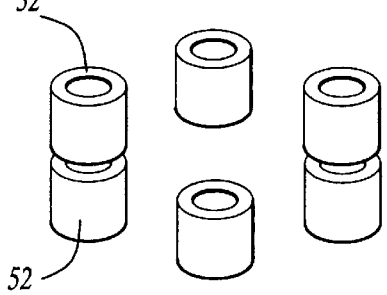
Fig-2
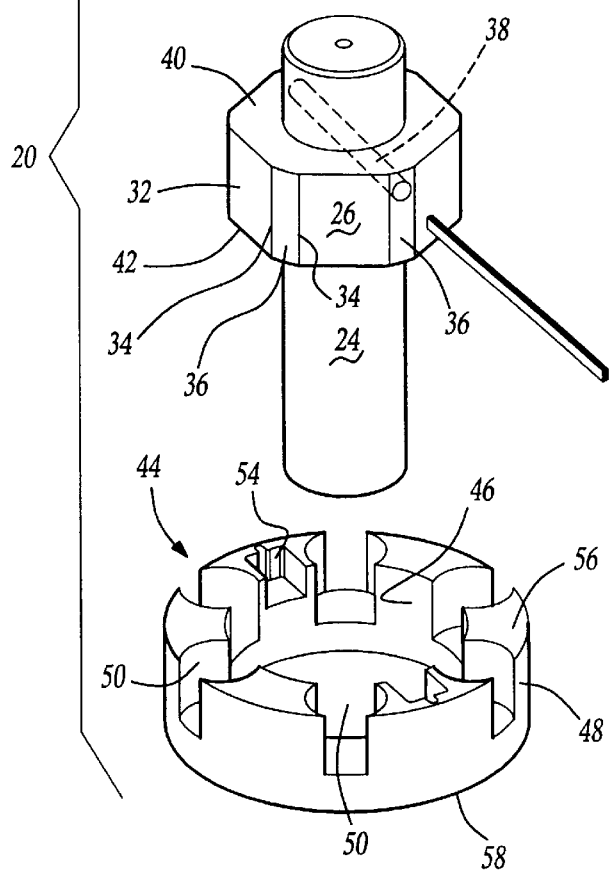

OVERRUNNING CLUTCH WITH SPRING ENERGIZED CAGE CENTERING DEVICE

FIELD OF THE INVENTION

The present invention relates to a bi-directional overrunning clutch including a spring energized centering device which creates a force between an inner race and an outer cage which urges the cage back to a neutral position with respect to the inner race.

BACKGROUND OF THE INVENTION

An annular bi-directional clutch includes an inner race, an outer race and a cage disposed between the inner and outer race. The cage includes a plurality of circumferentially spaced openings which receive rollers. The rollers selectively engage both the inner and outer race. As the inner race rotates from a neutral or rest position into an engaged or driving position the rollers are forced to ride up corresponding flats formed on the inner race by a resisting cage. Each roller is then trapped between the inner and outer race and torque is transmitted between the inner and outer races. As the clutch disengages the inertia of the rollers and cage tends to provide the force required to move the cage from the engaged to neutral position such that the rollers no longer engage both the inner and outer race. However, the inertial force of the rollers is often insufficient. Therefore, the clutch may not disengage, returning the cage back to its neutral position with respect to the inner race.

The prior art teaches the use of various methods to prevent rotation between a cage and an inner race. For example, a stop in the form of a peg may extend from a cavity formed in an outer periphery of the inner race into the sides of a split resilient cage. The resilient cage effects frictional engagement with the outer race before wedging means such as rollers come into action, to oppose the centrifugal forces associated with the wedging means, and to retain the wedging means in position. Alternatively, a spring loaded wedge may be used which simultaneously engages mutually inclined ends of the split cage. However, in the case of the spring loaded wedge, the rigid structure of the wedge is received in the cavity of the inner race and between the split cage ends. Thus, the spring loaded wedge functions in a manner parallel to the stop, preventing rotation between the cage and inner race, but permitting the cage to radially expand and contract.

There is also a teaching in the prior art of placing a spring between an input shaft and an output shaft to urge cam members disposed between them into a neutral position. However, such a usage is inapplicable to an overrunning clutch, wherein an outer race must be able to rotate relative to an inner race.

SUMMARY OF THE INVENTION

The present invention is directed to an improved bi-directional overrunning clutch having an inner race, an outer race, a cage disposed between the inner and outer races and a plurality of wedging devices which selectively engage both the inner and outer race. A spring centering device urges the cage back to a neutral position with respect to the inner race from an engaged position. The urging increases the more that the cage is rotationally misaligned with respect to the inner race.

Typically, the inner race includes a plurality of circumferentially spaced flats, each of the flats terminating at an edge. A cavity extends from a point between adjacent edges defining a face adjacent two flats radially into the inner race. It may extend all the way through the race and terminate at a second point opposing the first point.

One or more pockets are selectively defined between adjacent openings of the cage, the openings receiving the wedging devices and the pockets adapted to be aligned with the cavity of the inner race when the clutch is in a neutral position.

A biasing member extends from the cavity of the inner race into a corresponding pocket of the cage. The biasing member may be a leaf spring, a coil spring, or a compression spring with a ball positioned between a free end of the spring and the cage pocket.

The pockets of the cage may be adapted for the particular biasing member being used and include a groove to receive a free end of the biasing member or a surface adapted to either receive a spring end or mate with a ball.

As the clutch moves from an engaged position to a neutral or disengaged position, the inertia of the wedging devices and cage tends to provide the force required to move the cage from its engaged position to the neutral position. However, the inertial force of the wedging devices is often insufficient to provide disengagement. The use of the spring energized centering device provides the necessary additional rotational force to help with the disengagement and may be customized for a variety of different applications. One application of the inventive clutch is in the transmission of turf grooming tractors. When such a tractor turns a corner, the clutch allows the outer wheel to rotate more quickly, eliminating undesirable scuffing of the turf.

BRIEF DESCRIPTION OF THE DRAWINGS

The features and inventive aspects of the present invention will become more apparent upon reading the following detailed description, claims, and drawings, of which the following is a brief description:

FIG. 1 is a perspective view of a first embodiment of a bi-directional overrunning clutch with a spring energized centering device.

FIG. 2 is an exploded perspective view of the first embodiment and including the outer race.

DETAILED DESCRIPTION OF A PREFERRED EMBODIMENT

Figure 3:
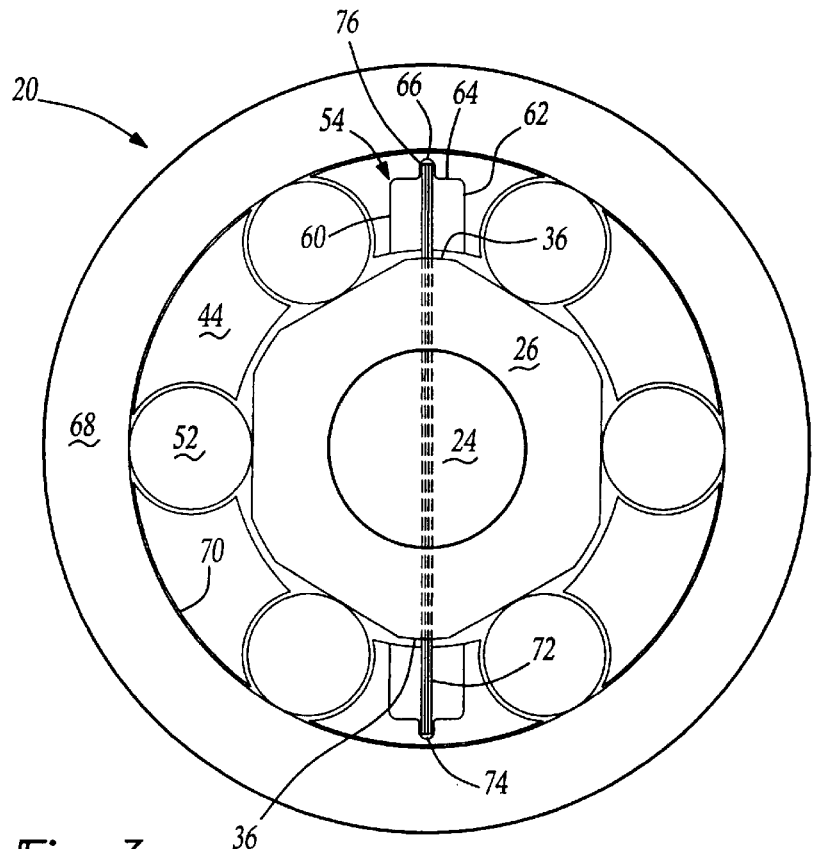
FIG. 3 is a planar view of the first embodiment in a neutral or rest position.

A first embodiment of a bi-directional clutch 20 with a spring energized cage centering device 22 is illustrated in FIGS. 1 through 5. Clutch 20 includes an input shaft 24 which extends through and is rigidly secured to an inner race 26. Race 26 includes an axially extending bore 28 receiving shaft 24 which is centered with respect to an outer periphery 30. Outer periphery 30 includes a plurality of circumferentially spaced flats 32, each of the flats terminating at an edge 34 of a face 36 defined between adjacent flats. Faces 36 define the greatest radial extent of inner race 26 while the midpoint of each flat 32 defines the least radial extent of the inner race.

A cavity 38 extends from a first face 36 through the centerpoint of both shaft 24 and inner race 26 and terminates at an opposing second face 36. Cavity 38 is located near an upper axial surface 40 of inner race 26 and spaced away from a lower axial surface 42.

A rigid non-split annular cage 44 includes an inner periphery 46 and an outer periphery 48. Inner periphery 46 is adjacent to, but does not contact outer periphery 30 of inner race 26. Cage 44 includes a plurality of circumferentially spaced openings 50 adapted to receive wedging devices such as rollers 52.

Figure 4:
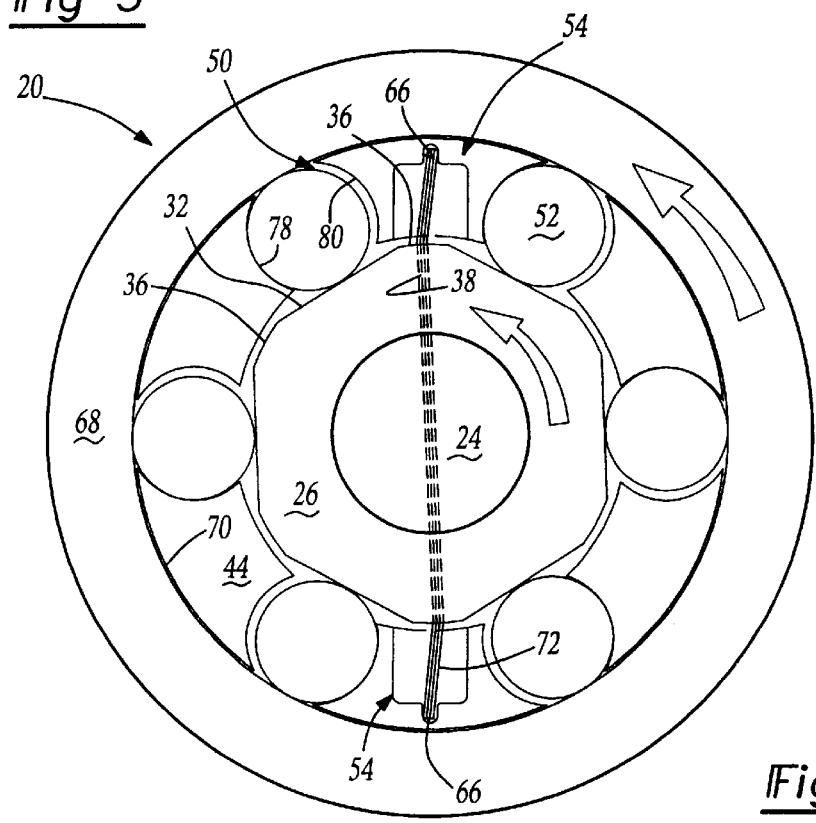
FIG. 4 is a planar view of the first embodiment when biased in a first rotational direction to an engaged or driving position.
Figure 5:
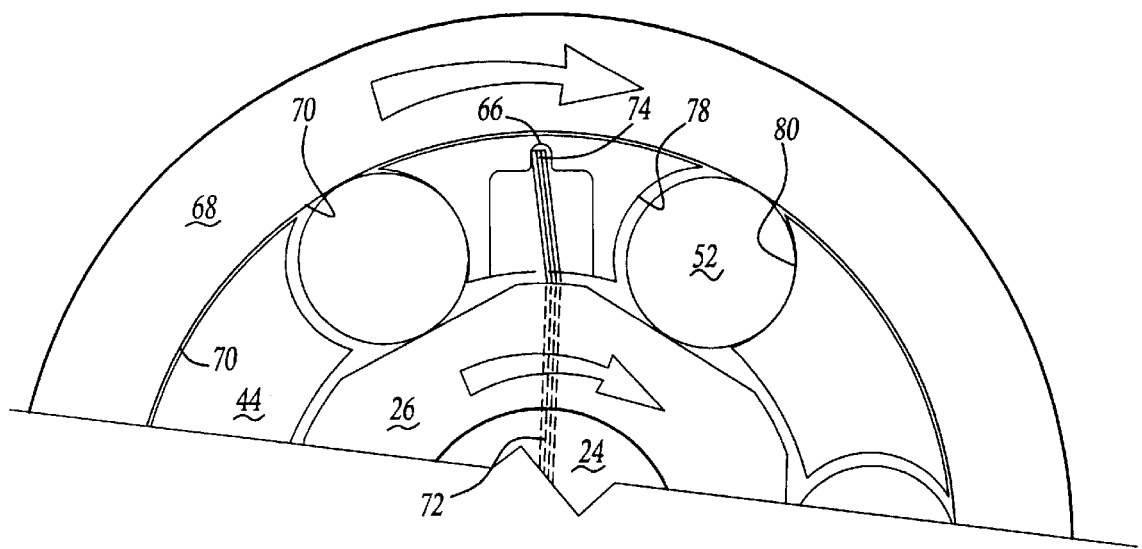
FIG. 5 is a planar view of the first embodiment when biased in a second rotational direction to an engaged or driving position.

One or more pockets 54 are selectively defined between adjacent openings 50. Pockets 54 extend radially outwardly from inner periphery 46, but terminate short of outer periphery 48. Further, pockets 54 extend axially from an upper axial surface 56, but preferably terminate short of a lower axial surface 58. As best shown in FIGS. 3 through 5, pockets 54 include side walls 60 and 62, a bottom wall 64, and an axially extending groove 66 extending radially outwardly of a centerpoint of bottom wall 64, but terminating short of outer periphery 48 of cage 44.

A rigid non-split annular outer race 68 includes an inner periphery 70 which is positioned closely adjacent to, but does not contact outer periphery 48 of cage 44. While not shown, an output means such as an output shaft is associated with outer race 68.

Inner race 26, cage 44, and outer race 68 are preferably metallic. Further, they are each rigid and closely aligned with another. They each share the same approximate axial extent.

Spring energized cage centering device 22 includes cavity 38, opposing pockets 54, and a biasing member 72 with free ends 74 and 76. Biasing member 72 is preferably a leaf spring. FIG. 3 shows clutch 20 with cage 44 in a neutral or rest position with respect to inner race 26. When in such a position, cavity 38 aligns with opposing pockets 54 such that free ends 74 and 76 are received in opposing grooves 66. Outer race 68 is freely rotatable with respect to inner race 26 and wedging devices 52 are not in engagement with outer race 68. Instead, if wedging devices 52 contact inner race 26, they do so at the midpoint of flats 32.

FIG. 4 illustrates a first engagement point of spring energized cage centering device 22 with both inner race 26 and outer race 68 moving in a counter clockwise direction as shown by the arrows. Rollers 52 have moved from the midpoint of flats 32 toward faces 36. Because of the increased radial diameter, rollers 52 have been forced radially outwardly into engagement with inner periphery 70 of outer race 68. Each of the rollers have been forced into engagement with a corresponding side wall 78 of their receiving opening 50, away from an opposing side wall 80. Biasing member 72 has been deformed from its relaxed state such that cavity 38 no longer aligns with opposing pockets 54, but free ends 74 and 76 still engage their respective groove 66. The more that cavity 38 is rotationally misaligned with respect to grooves 66, the greater the biasing provided by biasing member 72 to urge cage 44 back to a neutral position with respect to inner race 26.

FIG. 5 illustrates a second engagement point of spring energized cage centering device 22 with both inner race 26 and outer race 68 moving in a clockwise direction as shown by the arrows. Rollers 52 have moved from the midpoint of flats 32 toward a different face 36 as compared to FIG. 4. Each of rollers 52 have been forced into engagement with side wall 80 and away from side wall 78. Once again, biasing member 72 has been deformed from its relaxed state such that cavity 38 no longer aligns with opposing pockets 54, but free end 74 still engages groove 66.

As clutch 20 disengages, the inertia of rollers 52 and cage 44 tends to provide the force required to move cage 44 from its engaged position to the neutral position with respect to inner race 26 as shown in FIG. 3. However, the inertial force of the rollers and the cage is often insufficient to provide disengagement. Spring energized cage centering device 22 provides the necessary additional rotational force to help with the disengagement. Member 72 must be carefully selected to provide meaningful assistance when clutch 20 disengages, but still permit the engagement of the clutch when required for a particular application.

Figure 6:
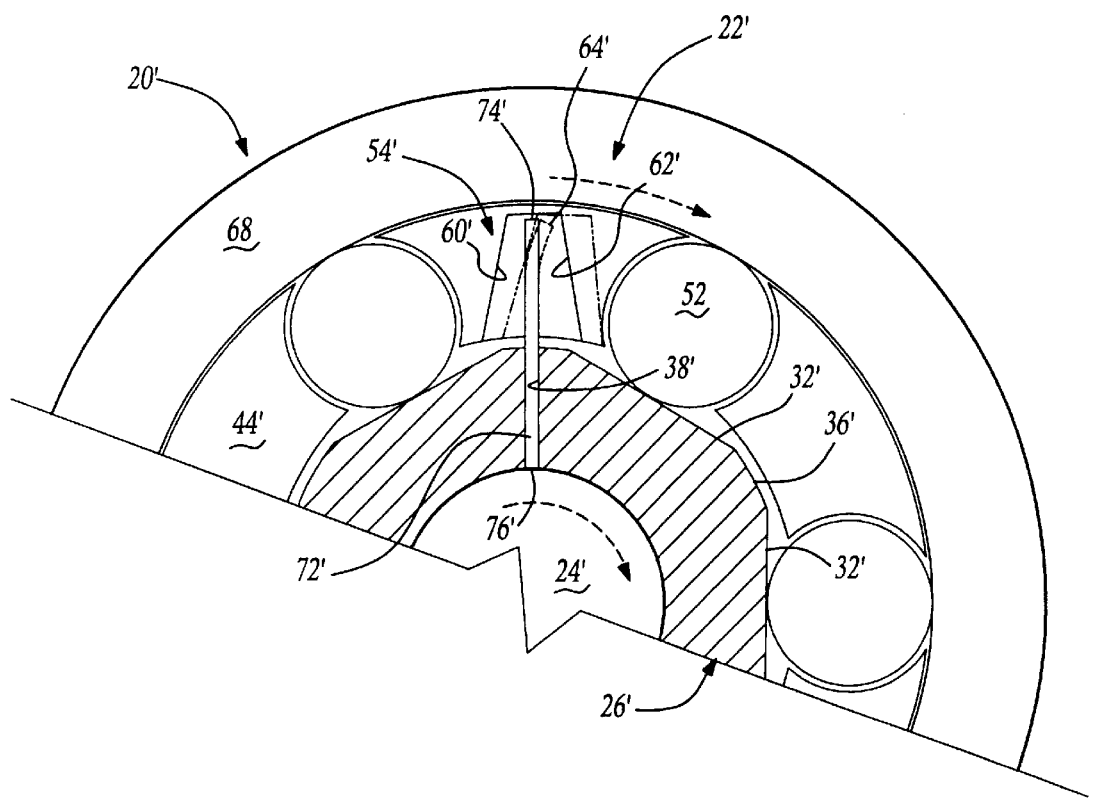
FIG. 6 is a partial cross-sectional view of a second embodiment of the present invention at both rest and when biased to an engaged or driving position.

A second embodiment of the present invention, a bi-directional clutch 20' with a spring energized cage centering device 22', is shown in FIG. 6. The key difference between clutch 20' and clutch 20 is the construction of device 22'. In particular, a cavity 38' does not extend through both inner race 26' and shaft 24'. Instead, one or more cavities 38' may be circumferentially spaced about the clutch, each cavity extending from a midpoint of a face 36' to the inner periphery of inner race 26'.

Pockets 54' are also different. Each pocket includes side walls 60' and 62', and a bottom wall 64'. However, there is no groove 66. Instead, each pocket 54' has a somewhat trapezoidal shape with side walls 60' and 62' extending outwardly at an angle with respect to bottom wall 64'. Pocket 54' may also be rectangular or incorporate radii.

Biasing member 72' is received in cavity 38' and terminates at a free end 76' adjacent the inner periphery of inner race 26. An opposing free end 74' engages one of the side walls of pocket 54' when clutch 20' is engaged. For example, as shown in phantom in FIG. 6, when both inner race 26' and outer race 68 are engaged such that they rotate clockwise together, the free end 74' of biasing member 72' engages side wall 60'. Biasing member 72' is preferably a coil spring.

An advantage of the second embodiment is that the rotational biasing of biasing member 72' may be more precisely controlled such that there is no engagement between the member and the wall of pocket 54' until a certain degree of misalignment has taken place. Once there is engagement, biasing member 72 reacts the side wall of pocket 54' to urge cage 44' back to its neutral position with respect to inner race 26'.

Figure 7:
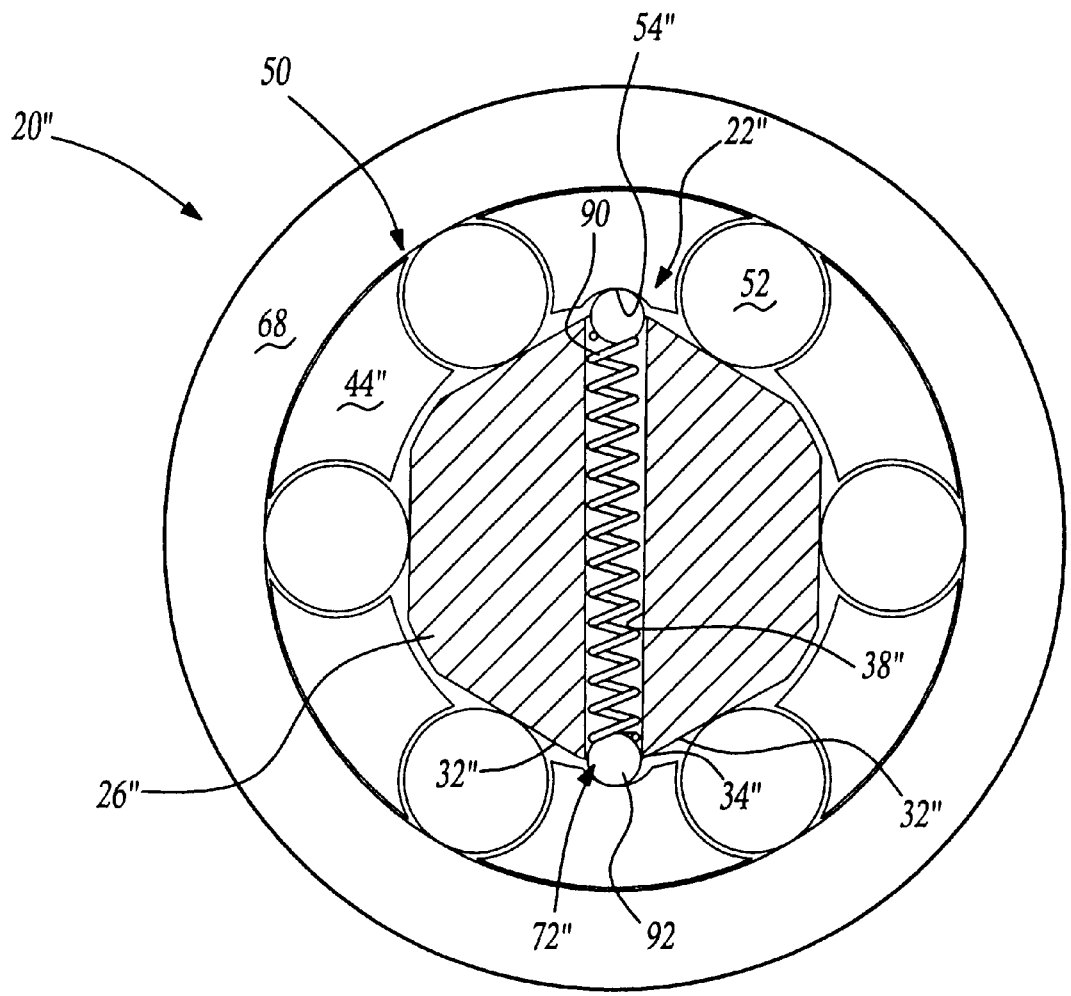
FIG. 7 is a cross-sectional view of a third embodiment of the present invention when at rest.

A third embodiment of a bi-directional clutch 20" with a spring energized cage centering device 22" is illustrated in FIG. 7. Clutch 20" does not include a separate inner race and shaft. Instead, there is a single inner race 26". Cavity 38" extends from a first face 36" through the centerpoint of inner race 26" and terminates at an opposing second face 36" in the same manner as with clutch 20.

More significantly, biasing member 72" includes a compression coil spring 90 having free ends 74" and 76". Thus cavity 38" has a greater diameter compared with cavity 38' using a leaf spring. A metallic and preferably steel ball 92 is disposed between each free end and a corresponding pocket 54" and urgingly engaged into pocket 54" by spring 90. Pockets 54" are selectively defined between adjacent openings 50" and extend only a short distance radially outwardly from inner periphery 46". Pockets 54" are arcuate in shape, lacking separate side walls and a bottom wall. The diameter of pockets 54" are significantly greater than the balls 92 received in pockets 54". Flat ramps or compound radii may also be used.

Clutch 20" operates in a similar manner as compared with the first two embodiments. Biasing member 72" rotationally biases cage 44" with respect to inner race 26" to a neutral position wherein cavity 38" aligns with the centerpoint of opposing pockets 54". Spring member 72" also allows the engagement of rollers 52 with inner periphery 70 of outer race 68 to provide engagement in either a clockwise or counterclockwise direction between inner race 26" and outer race 68. An increase in rotational misalignment between cage 44" and inner race 26" increases the spring force of spring 90 as ball 92 rides up the ramp or radius of pocket 54", with a corresponding increase in the urging of cage 44" back to a neutral position. The required spring force may often be more finely tuned with respect to clutch 20" when compared to clutch 20 in view of the nature of the spring 90, and the relationship between balls 92 and corresponding finely controlled surface shape of pockets 54". There is always facial contact between the surface of the pocket and the biasing element. Wear may also be decreased through the use of balls 92.

The use of a single cavity extending through the centerpoint of an inner race in combination with a single biasing member provides a number of advantages to both the first and third embodiment. Manufacturing tolerances associated with having multiple cavities are minimized. Because only a single biasing element is typically being used, there is less of an issue when compared to a clutch requiring multiple different biasing elements. Each of the elements must be very similar to provide the same degree of rotational resistance. Otherwise, clutch, spring, and pocket wear may be increased.

The disclosed embodiments and examples are given to illustrate the present invention. However, they are not meant to limit the scope and spirit of the present invention. Therefore, the present invention should be limited only by the appended claims.

What is claimed is:

1. An overrunning clutch comprising:

an inner race having an outer periphery with a cavity extending radially inwardly from said outer periphery;

an outer race having an inner periphery;

a rigid, non-split cage disposed between said inner and outer race, having an outer periphery adjacent said inner periphery of said outer race and an inner periphery adjacent said outer periphery of said inner race, said cage including a plurality of circumferentially spaced openings, and at least one pocket defined between adjacent openings extending radially outwardly from said inner periphery of said cage;

a plurality of wedging devices disposed in said openings of said cage and selectively engaging each of said inner and outer race;

a biasing member engaged between said cavity of said inner race and said at least one pocket of said cage, said biasing member including a ball engaging said at least one pocket and permitting rotational movement between said inner race and said cage, but rotationally biasing said cage with respect to said inner race toward a neutral position.

2. A clutch as recited in claim 1, wherein said pocket is spaced radially inwardly from said outer periphery of said cage and is arcuate, having a circumference greater than a corresponding circumference of said ball.

3. A clutch as recited in claim 1, wherein said biasing member includes a spring biasing said ball radially outwardly from said inner race.

4. A clutch as recited in claim 3, wherein said spring is a coil spring.

5. A clutch as recited in claim 1, wherein said cavity extends through said inner race to form first and second openings in said outer periphery.

6. A clutch as recited in claim 5, wherein said cavity extends through the centerpoint of said inner race such that said openings are on opposing faces of said outer periphery of said inner race.

7. A clutch as recited in claim 5, wherein said biasing member extends through said cavity and radially outwardly from said first and second openings and engages said cage at two different circumferential locations.

8. A clutch as recited in claim 1, wherein said wedging devices move from said neutral position to an engaged position with respect to each of said inner and outer races by means of engagement with a flat of the inner race, said cavity located midway between two adjacent flats on a distinct face of said inner race.

\* \* \* \* \*